United States Patent [19]

Izzo et al.

[11] Patent Number: 4,904,496

[45] Date of Patent: Feb. 27, 1990

[54] LOW-FAT PROCESSED MEAT PRODUCTS

[75] Inventors: Henry J. Izzo, Bridgewater; Richard H. Lingelbach, Somerville; Mauro D. Mordini, Parsippany, all of N.J.

[73] Assignee: Thomas J. Lipton, Jr., Engelwood Cliffs, N.J.

[21] Appl. No.: 334,778

[22] Filed: Apr. 6, 1989

Related U.S. Application Data

[63] Continuation of Ser. No. 141,944, Jan. 11, 1988, abandoned.

[51] Int. Cl.$^4$ .............................................. A23L 1/317
[52] U.S. Cl. ..................................... 426/646; 426/105
[58] Field of Search ............... 426/646, 652, 574, 804, 426/105

[56] References Cited

U.S. PATENT DOCUMENTS

| | | |
|---|---|---|
| 3,023,104 | 2/1962 | Battista . |
| 3,519,434 | 7/1970 | Schuppner . |
| 3,649,301 | 3/1972 | Stump et al. ..................... 426/646 X |
| 3,997,672 | 12/1976 | Stead et al. ..................... 426/646 X |
| 4,132,810 | 1/1979 | Knutson ........................... 426/646 X |
| 4,133,897 | 1/1979 | Flanyak et al. .................. 426/646 X |
| 4,143,164 | 3/1979 | Shanbhag et al. ................... 426/104 |
| 4,324,807 | 4/1982 | Kim et al. ........................ 426/646 X |
| 4,376,134 | 3/1983 | Kumar ................................. 426/656 |
| 4,504,515 | 3/1985 | Hohenester et al. ............... 426/641 |

FOREIGN PATENT DOCUMENTS

| | | | |
|---|---|---|---|
| 1120774 | 3/1982 | Canada ............................... 426/574 |
| 0044358 | 1/1982 | European Pat. Off. ............ 426/574 |
| 0074185 | 3/1983 | European Pat. Off. . |
| 1562568 | 3/1980 | United Kingdom . |

Primary Examiner—Arthur L. Corbin
Attorney, Agent, or Firm—Brumbaugh, Graves, Donohue & Raymond

[57] ABSTRACT

Low fat emulsion-type sausage products which comprise a continuous phase of heat-set meat emulsion and a discontinuous phase of particles of a water in oil emulsion, the water in oil emulsion having edible fat as a continuous phase and an aqueous gelatin solution as its discontinuous phase. A method for making the sausage products are also disclosed.

14 Claims, No Drawings

LOW-FAT PROCESSED MEAT PRODUCTS

This application is a continuation of application Ser. No. 141,944, filed on Jan. 11, 1988, now abandoned.

BACKGROUND OF THE INVENTION

The present invention relates to processed meat products having low fat and low cholesterol content while still retaining highly desirable appearance, taste and cooking performance characteristics, and to a method of making said products. More particularly, the present invention relates to low fat emulsion-type sausage products and to a novel method for making said products.

The prior art has adopted a number of approaches in attempts to reduce the fat and cholesterol content of prepared meat products. One such approach is found in U.S. Pat. No. 3,023,104 wherein the desired results are obtained by simply extending conventional products through the addition of crystallite aggregates of cellulose; the cellulose being inert, the resulting product has less of each ingredient of the natural product. U.S. Pat. No. 4,504,515, in another approach, prepares low-fat meat products by combining high levels of skimmed milk or whole milk with comminuted lean meat. A low cholesterol sausage analog of the ground meat type using egg white as the heat denaturable binder system is described in U.S. Pat. No. 4,376,134.

In another aspect of the prior art, meat analogs, such as bacon and sausage analogs, have been prepared by preparing separate phases, one for the fat phase and a second lean meat phase and by then combining these phases to provide a completed product. The intent here is to prepare analogs of the respective lean and fat portions of the natural meat product and to then combine them. In the case of bacon, for example, as described in U.S. Pat. No. 4,143,164, two separate phases are prepared, joined together by layering, and the layered mass is subsequently heat set to form the final product. According to the patent, the fat phase analog is an aqueous matrix of a heat coagulable protein from the group consisting of egg albumen and blood albumen, together with a water soluble film forming component such as gelatin. The matrix has a fat component dispersed therein as fine droplets. The fat phase analog in the example contains about 24% water and about 47% oil, the balance being egg albumen, flavor, color and 2% gelatin. The fat is dispersed in a continuous matrix containing the gelatin and heat coagulable protein, and the stability of the fat dispersion depends upon the coagulating action of the heat employed during processing.

Other attempts have been made to prepare low fat products utilizing technology which forces meat protein to bind increased quantities of water or which entail the use of cereal protein and/or carbohydrate extenders to act as agents which bind larger quantities of water in the product. The resulting products generally have an unacceptable texture and taste, being either overly wet or mealy in nature.

The art of making processed meat products and particularly those known as emulsion-type sausage products is highly developed. The raw materials used in making sausages of this type vary with the nature of the product being made and with the availability of different cuts of meat. In all of the emulsion-type processed meat products, salt is added to the meat and the meat comminuted in the presence of sufficient of water to solubilize a meat protein called myosin. The source of the myosin is the non-collagen meat fibers. The myosin forms a coating around each individual fat globule in the emulsion which, upon heating, sets to form a matrix which retains the structure of the product.

In the United States, government regulations place certain constraints on the fat content of processed meat products and upon their moisture content and shrinkage characteristics. For example, emulsion-type sausages such as frankfurters are allowed to have no more than 30% by weight of fat. In addition, the finished product must have a moisture content which does not exceed four times the percentage of protein plus 10% of the finished weight.

The presence of fat in emulsion-type processed meats, such as frankfurters, contributes to its eating qualities and it is desirable to have at 25% to 30% fat in frankfurters in order to provide a product which is flavorful, succulent and has the tender texture found acceptable to most consumers. Products in some part of the United States are formulated to have lower levels of fat, but such products are found to be tough, not succulent, and undesirable for nationwide distribution. A substantial level of fat apparently modifies the nature of the matrix formed during the heat setting or coagulation of emulsion. Thus, although it is desirable for dietary reasons to reduce the fat content of frankfurters to substantially below the 30% maximum permitted, such reduction in fat level cannot be achieved using present day technology without a concomitant substantial sacrifice in the texture and flavor quality of the product.

STATEMENT OF THE INVENTION

It has now been found that a low fat, low cholesterol processed meat product of excellent eating qualities is provided by preparing a product comprising a continuous phase of heat-set meat emulsion and a discontinuous phase comprising particles of a water in oil emulsion, the continuous phase of the water in oil emulsion being an edible fat, and the discontinuous phase thereof being an aqueous gelatin solution. In a preferred embodiment, the products of the present invention are emulsion-type sausages having a fat content in the range of 5% to 20%, the major portion of which is dispersed throughout the emulsion matrix as droplets of water in oil emulsion, the discontinuous phase of which is an aqueous gelatin solution wherein the gelatin is present in an amount higher than the critical concentration at 59° F.

The products of the present invention have fat and cholesterol contents ranging from two-thirds to one-half less than that which these meat products normally contain. Frankfurters, for example, which have a standard of identity which allow for up to 30% fat in the finished product, can be made according to this invention to contain as little as 5% fat with the correspondingly reduced amount of cholesterol all without a sacrifice in eating quality or appearance of the final product.

It has further been found that the highly desirable product of the present invention may be provided by a method which includes the steps of (a) forming a water in oil emulsion by forming an aqueous gelatin solution in which the gelatin has a concentration above the critical concentration at 59° F., and combining the gelatin solution with an edible fat to form a water in oil emulsion, (b) forming a meat emulsion of high protein content and good binding capacity, (c) dispersing droplets of the water in oil emulsion formed in step (a) evenly throughout the meat emulsion formed in step (b) and (d) causing the meat emulsion to set. It is preferred that the fat content of the product be in the range of 5% to 20% by weight, and that the major portion of the fat be supplied by the water in oil emulsion found in step (a). It is further preferred that the meat emulsion of step (b) and the water in oil emulsion of step (a) be combined in the relative proportion, by weight, of 2.5 to 1.0. It is also preferred that the meat emulsion be caused to set by heating.

Thus, a major portion of the fat content of the products of the invention is extended by combination with the gelled aqueous gelatin. This permits the lean portion of the meat product or emulsion to remain essentially the same, undiluted with excess water, which in turn permits maintenance of normal texture and taste characteristics in the final product.

DETAILED DESCRIPTION OF THE INVENTION

The products with which the present invention is concerned are all processed meat products which normally include a substantial level of fat in order to obtain desired eating characteristics. More particularly, the products of this invention are those processed meat products which involve the preparation of meat emulsions utilizing myosin as a binder. Examples of such products include ground meat products such as breakfast sausage, Italian sausage, chopped meat for use in hamburgers and meat loaf, and luncheon meats such as salami. This invention will be further described in terms of an emulsion based sausage product, such as frankfurters, knockwurst, bologna, liverwurst, and braunschweiger, but it is understood to apply to all processed meat products utilizing myosin to bind meat particles, including fat, in a texture-imparting matrix of meat protein.

The first step in the process of the present invention involves the preparation of a water in oil emulsion which utilizes a fat as a continuous phase, and an aqueous gelatin solution as a discontinuous phase. The gelatin stabilizes the emulsion and, where the product is eaten cold, will give the same taste and textural impression as given by fat; both gelatin and food grade fats melt on the tongue at roughly comparable temperatures. It is preferred that sufficient gelatin be present to insure that the emulsion droplets contain an aqueous gel at room temperature. Thus, the gelatin present in the edible aqueous gelatin solution should be in an amount higher than the critical concentration at 59° F. On the other hand, a high level of gelatin will result in a tough, rubbery product. The precise amount of gelatin required is not critical, and in the usual case, amounts ranging from 1–10 times the critical concentration will be satisfactory. The optimum amount of gelatin is in the range of 1.5–5% by weight of the aqueous phase of the water in oil emulsion with a level of 3% on the same basis being preferred. It is also noted that the bloom value of the gelatin used can vary; good results are obtained using pork skin gelatin, type A, of 170, 225 and 260 bloom. Beef bone gelatin of the same bloom strength is also suitable.

The gelatin solution is prepared by dissolving the gelatin in water at elevated temperatures. Normally, the powdered gelatin is added to the water and the mixture allowed to stand until the gelatin is wetted. The mixture is then heated, for example to 140° F., and stirred until the gelatin is dissolved.

It is also preferred, for reasons of microbiological stability, that the gelatin solution contain salt and curing agent, and at approximately the same level as the high protein meat phase. Accordingly, sodium chloride is added to the gelatin solution at this stage, preferably at a level of 2% by weight of the aqueous solution. Sodium nitrite is also added, preferably at a level of 0.025%.

The gelatin solution is also advantageously provided with auxiliary flavoring substance including hydrolyzed animal and vegetable protein-based flavors and other commercially available meat flavors. In addition, reducing sugars may be added to produce meat flavors in situ by reaction with amino acids in the aqueous gelatin phase.

The fat component of the water in oil emulsion phase may be any edible fat compatible with the processed meat product being produced. In making frankfurters, for example, the usual frankfurter raw materials may be utilized. One excellent product was made utilizing beef trimmings containing 80% fat and 20% lean. Beef trimmings having 50% lean and 50% fat may also be used. Meat trimmings having 12% lean and 88% fat are also useful, but are not normally available on a commercial basis.

The meat trimmings needed as a source of fat are initially ground, as through a ¼ inch grinding plate, and then comminuted in a high speed blender, such as a Stephen Vertical-Cutter/Mixer operated at 3400 rpm.

The water in oil emulsion is next prepared by combining the gelatin solution with the comminuted fat-rich meat trimmings in a high speed blender, such as the Stephen Vertical-Cutter/Mixer, operated at the 3400 rpm level. The temperature of the gelatin solution when added is preferably at 70°–85° F., and the comminuted meat trimmings are preferably at 70° F. The blender is operated for from one to five minutes, depending on the hardness of the fat trimmings and the temperature of the gelatin solution. The formation of a water in oil emulsion is confirmed by microscopic examination.

Other suitable edible fats which may be used in the practice of this invention include various animal and vegetable fats. In addition, at least a portion of the natural fat content can be replaced by fat substitutes, such as the sucrose poly esters.

In accordance with the second stage of preparing the product of this invention, a meat emulsion of high protein content and good binding capacity is prepared using high protein content lean meats in accordance with any of several prior art procedures used in making sausage emulsions. Meat chunks of meats such as bull meat, boneless primal cuts of cattle, hogs, veal, sheep, as well as chicken and turkey, or other cuts or mixtures thereof, may be employed. In accordance with one preferred embodiment, beef trimmings having 80–90% lean meat, with the balance fat, are placed into a chopper, mixed with sodium chloride, 2%, sodium nitrite, 0.02%, sodium erythorbate, 0.04%, and added water and the mixture is chopped to a fine consistency. A "sticky" feel develops indicating that the water-soluble meat protein myosin has been solubilized and that the emulsion has developed a good binding capacity.

As recognized in the art, too great a build-up of heat is to be avoided at this stage of the emulsion preparation. Temperatures above 110°–115° F. cause premature coagulation or denaturing of the protein and should be avoided to insure that a stable meat emulsion is obtained.

Additives other than the salt and curing agents may be beneficial. Emulsifying agents may be added to improve the emulsion. Good results have been obtained, for example, using a mixture of emulsifying agents comprising 0.3% Myverol, a mixture of mono- and diglycerides and 0.2% lecithin, both by weight of the fat in the meat emulsion.

The meat emulsion of high protein content may additionally contain other edible materials such as vegetables, herbs, spices, vegetable protein such as soy bean protein and fungal protein.

The water in oil emulsion and the meat emulsion of high protein content are combined in proportions sufficient to provide a final frankfurter of desired low fat content while maintaining the proportion of water to protein within the constraints set forth by government regulations. The exact proportions within which these phases are combined will depend on the nature of the lean meat and fat components of each of these two phases and will vary in accordance with considerations well known in the art.

It is also noted that the process of this invention which uses two phases, that is, the water in oil emulsion containing gelatin and the high protein meat emulsion, may be used to advantage in the art recognized procedures known as least-cost formulation and pre-blending of sausage. The water in oil emulsion containing gelatin provides the major fat element of the composition and permits the realization of a high quality product having as little as 5% fat.

The proportion of edible fat to aqueous gelatin solution in the water in oil emulsion may vary, depending on the fat content of the high protein content meat emulsion and upon the fat content and water content desired in the final product. One preferred water in oil emulsion contained, by weight, 32% meat fat, 8% lean meat and 60% of a 3%, by weight, aqueous gelatin solution.

The invention will be further described in the following examples:

EXAMPLE 1

Procedure for Making Low-Fat Frankfurters

Low-fat frankfurters having half the fat of normal frankfurters, e.g. 15% fat as compared with 30% fat, were prepared as follows:

1. Preparation of water in oil emulsion.

An aqueous gelatin solution containing 3.0% by weight of 225 bloom pork skin type A gelatin was prepared by dissolving the gelatin in the water at 140° F.

Sodium chloride at a level of 2%, and sodium nitrite, at a level of 0.025% were added to and dissolved in the gelatin solution.

Beef trimmings containing 80% fat and 20% lean meat were ground by passage through a ¼ inch grinding plate. The ground trimmings were then placed in a Stephen Vertical Cutter/Mixer, Code No. 2184, Model VCM-12, made by the Stephen Food Technology Corp. of West Germany. The Stephen Cutter was operated at 3400 rpm for from 4 to 6 minutes, raising the temperature to between 70° F. to 85° F. The aqueous gelatin solution, at a temperature of 80°-85° F., was then added to the Stephen Cutter and combined with the comminuted trimmings in the proportion by weight of 60% aqueous gelatin solution and 40% of the 80% fat/20% lean trimmings. The cutter/mixer was then operated at 3400 rpm during a period of one minute to five minutes, depending on the hardness of the fat trimmings and the temperature of the gelatin solution, and until microscopic examination confirmed the product to be a water in oil emulsion.

2. Preparation of the frankfurters

After preparing the water in oil emulsion, a relatively conventional method of producing frankfurters was used. Following the normal procedure for making frankfurters, lean meat, in the form of beef trimmings having 70% to 90% lean meat with the corresponding differences present as fat, was put into a Hobart Chopper where it was mixed with sodium chloride, 2%, sodium nitrite, 0.02%, and sodium erythorbate at 0.04%, all by weight of the finished product, and allowable added water and was chopped to a fine consistency. At an initial point in the chopping process, the temperature of the lean beef was approximately 35°–45° F. and by the end of the chopping process, before the water in oil emulsion was added, the temperature of the emulsion had increased to approximately 50° F. At that point, the lean beef with added salt, curing agents, seasoning and added water was relatively finely chopped and had a "sticky" feel, indicating that available meat proteins were solubilized.

The material was then taken from the meat chopper, put into a Stephen Cutter and the water in oil emulsion prepared earlier was added. The mixture was then high shear blended in the Stephen at 3400 rpm for a period of 1.5 to 5 minutes to a final temperature of approximately 65° F. The mixture was then stuffed with a normal meat stuffer, hydraulic pressure causing the meat mixture to extrude through a horn into a synthetic casing of approximately 26 mm. The stuffed casing was processed in a traditional smoke house using the following times and temperatures:

30 minutes at 140° F.
30 minutes at 150° F.
30 minutes at 165° F.
12 minutes at 175° F.

and held at 175° F. until a final internal sausage temperature of 165° F. was reached. The frankfurters were then cooled in a cold water bath and stored at 40° F.

The finished product had the following analysis:
Protein—15.30%
Fat—13.83%
Water—69.13%
Salt, Spices—1.74%

Upon evaluation, the frankfurters were found to be of high quality, being succulent and having an excellent texture and appearance.

EXAMPLE 2

The gelatin containing water in oil emulsion prepared in Example 1 was used to prepare frankfurters, employing more traditional frankfurter making equipment. A Buffalo Silent Cutter (Chopper) was used to mix the water in oil emulsion with the lean meat, to which salt, sodium nitrite, sodium erythorbate, and seasoning had already been added. Beef trimmings having 70% to 90% lean meat was added to the chopper with sodium chloride, 2%, sodium nitrite at 0.02% and sodium erythorbate at 0.04%, all by weight of the finished product. The mixture was chopped 3-6 minutes at 35°-45° F. The gelatin-containing water in oil emulsion was added at a meat emulsion temperature of 45°-48° F. and chopping continued for two additional minutes, and until the temperature increased to 48°–52° F.

The partially finished comminuted mixture was then run through a Mincemaster with two (2) plates (2.5 mm + 1.7 mm) and then into the hopper of a continuous stuffing machine at 62° F. The frankfurter emulsion was stuffed into 22 mm synthetic casing and the links run through a commercial smoke house according to the following schedule:
  130° F.—20 minutes
  150° F.—30 minutes
  185° F.—Until an internal temperature of 165° F. was attained Total time elapsed was 1 hour 15 minutes. The finished product had the following approximate analysis:
  Protein—14.63
  Fat—15.09
  Water—67.56
  Salt, Spices—2.72

Upon evaluation, the frankfurters were found to be of high quality, being succulent and having an excellent taste, texture and appearance. Tasters were unable to organoleptically differentiate between normal frankfurters made as a control and having 30% fat, and the frankfurters made in this example.

EXAMPLE 3

A pork breakfast sausage product is prepared by the following procedure:

A gelatin containing water in oil emulsion is prepared using pork trimmings containing 80% fat and 20% lean, following the procedure set forth in Example 1. Following its formation, the final emulsion is cooled to a temperature below its solidification point.

In a separate procedure, pork trimmings having about 80% lean meat are added to a Laska bowl chopper, together with sodium chloride at 2%, sodium erythorbate at 0.04%, and small amounts of white pepper, sage and mace as seasonings, all by weight of the finished product. The mixture is chopped 1 to 3 minutes at 35° to 45° F. The solidified gelatin containing water in oil emulsion prepared above is added at the meat emulsion temperature and coarse chopped for an additional 2 to 3 minutes.

The coarse chopped, comminuted mixture is then run into the hopper of a continuous stuffing machine. The sausage emulsion is stuffed into 22 mm, edible casings and links of normal breakfast sausages are produced.

Upon cooking and evaluation, the sausages are found to be of high quality, being succulent, having an excellent texture and appearance, and having about half the usual fat content.

EXAMPLE 4

A beef breakfast sausage product is prepared by the following procedure:

A gelatin containing water in oil emulsion is prepared using beef trimmings containing 80% fat and 20% lean, following the procedure set forth in Example 1. Following its formation, the final emulsion is cooled to a temperature below its solidification point.

In a separate procedure, beef trimmings having about 80% lean meat are added to a Laska bowl chopper, together with sodium chloride at 2%, sodium erythorbate at 0.04%, and small amounts of white pepper, sage and mace as seasonings, all by weight of the finished product. The mixture is chopped 1 to 3 minutes at 35° to 45° F. The solidified gelatin containing water in oil emulsion prepared above is added at the meat emulsion temperature and coarse chopped for an additional 2 to 3 minutes.

The coarse chopped, comminuted mixture is then run into the hopper of a continuous stuffing machine. The sausage emulsion is stuffed into 22 mm, edible casings and links of normal breakfast sausages are produced.

Upon cooking and evaluation, the sausages are found to be of high quality, being succulent, having an excellent texture and appearance, and having about half the usual fat content.

EXAMPLE 5

Gelatin containing water in oil emulsion is used to prepare salami by he following procedure:

A gelatin containing water in oil emulsion is prepared using beef trimmings containing 80% fat and 20% lean meat, following the procedure set forth in Example 1. At the conclusion of its preparation, the final emulsion is cooled to a temperature below its solidification point.

In a separate procedure, beef trimmings having 70–90% lean meat are added to a Laska bowl chopper, where it is chopped with sodium chloride, 2%, sodium nitrite at 0.02% and sodium erythorbate at 0.04%, all by weight of the finished product. The mixture is chopped 1 to 3 minutes at 35°–45° F. The solidified gelatin containing water in oil emulsion prepared above is added to the chopped mixture at the meat emulsion temperature and chopping is continued for an additional 1–2 minutes to produce a coarse chopped product. The coarse chopped, comminuted mixture, a salami emulsion, is then run into a hopper of a continuous stuffing machine. The salami emulsion is stuffed into 78 mm size synthetic casings and the large links run through a commercial smokehouse according to the following schedule; 130° F. for 20 minutes, 150° F. for 30 minutes, 180° F. until an internal temperature of 150° F. for 30 minutes was attained. The temperature of the smokehouse is then lowered to slowly dry out the salami.

Upon evaluation, the salami is found to be of high quality, being succulent and having excellent taste, texture and appearance. Salami so produced cannot be distinguished from salami prepared with a normal level of fat, even though the finished product has a substantially reduced fat content.

We claim:

1. A processed meat product comprising a continuous phase of heat-set meat emulsion and a discontinuous phase, the discontinuous phase comprising particles of a water in oil emulsion having a continuous phase and a discontinuous phase, the continuous phase of said water in oil emulsion comprising edible fat, and the discontinuous phase of said water in oil emulsion comprising an aqueous gelatin solution.

2. The product of claim 1, wherein gelatin is present in the aqueous gelatin solution in an amount higher than the critical concentration at 59° F.

3. The product of claim 1, wherein the discontinuous phase of said water in oil emulsion additionally comprises particles of edible fat.

4. The product of claim 1, wherein the fat content of the product is in the range of 5 to 20%.

5. The product of claim 1, wherein the edible fat is comminuted fat-rich meat trimmings.

6. An emulsion-type sausage comprising a continuous phase of heat-set meat emulsion and a discontinuous phase, the discontinuation phase comprising particles of a water in oil emulsion having a continuous phase and a discontinuous phase, the continuous phase of said water in oil emulsion comprising edible fat and the discontinuous phase of said water in oil emulsion comprising a gelled aqueous gelatin solution.

7. The sausage of claim 6, wherein the continuous phase of heat-set meat emulsion is a high protein meat emulsion.

8. The sausage of claim 7, wherein the continuous phase of said water in oil emulsion comprises comminuted high fat meat trimmings.

9. The sausage of claim 8, wherein the fat content is 5-20% by weight.

10. The sausage of claim 8, wherein gelatin is present in the aqueous gelatin solution in an amount higher than the critical concentration at 59° F.

11. A sausage of the emulsion-type comprising a continuous phase of heat-set meat emulsion and a discontinuous phase, wherein the discontinuous phase includes a major fat content of the sausage as particles of water in oil emulsion having a continuous phase and a discontinuous phase, the continuous phase of said water in oil emulsion comprising edible fat and the discontinuous phase of said water in oil emulsion comprising an aqueous gelatin solution in which the gelatin concentration is higher than the critical concentration at 59 degrees F.

12. The product of claim 11, wherein the sausage is a frankfurter.

13. The product of claim 11, wherein the sausage is breakfast sausage.

14. The product of claim 11, wherein the sausage is salami.

* * * * *